Figure 2:
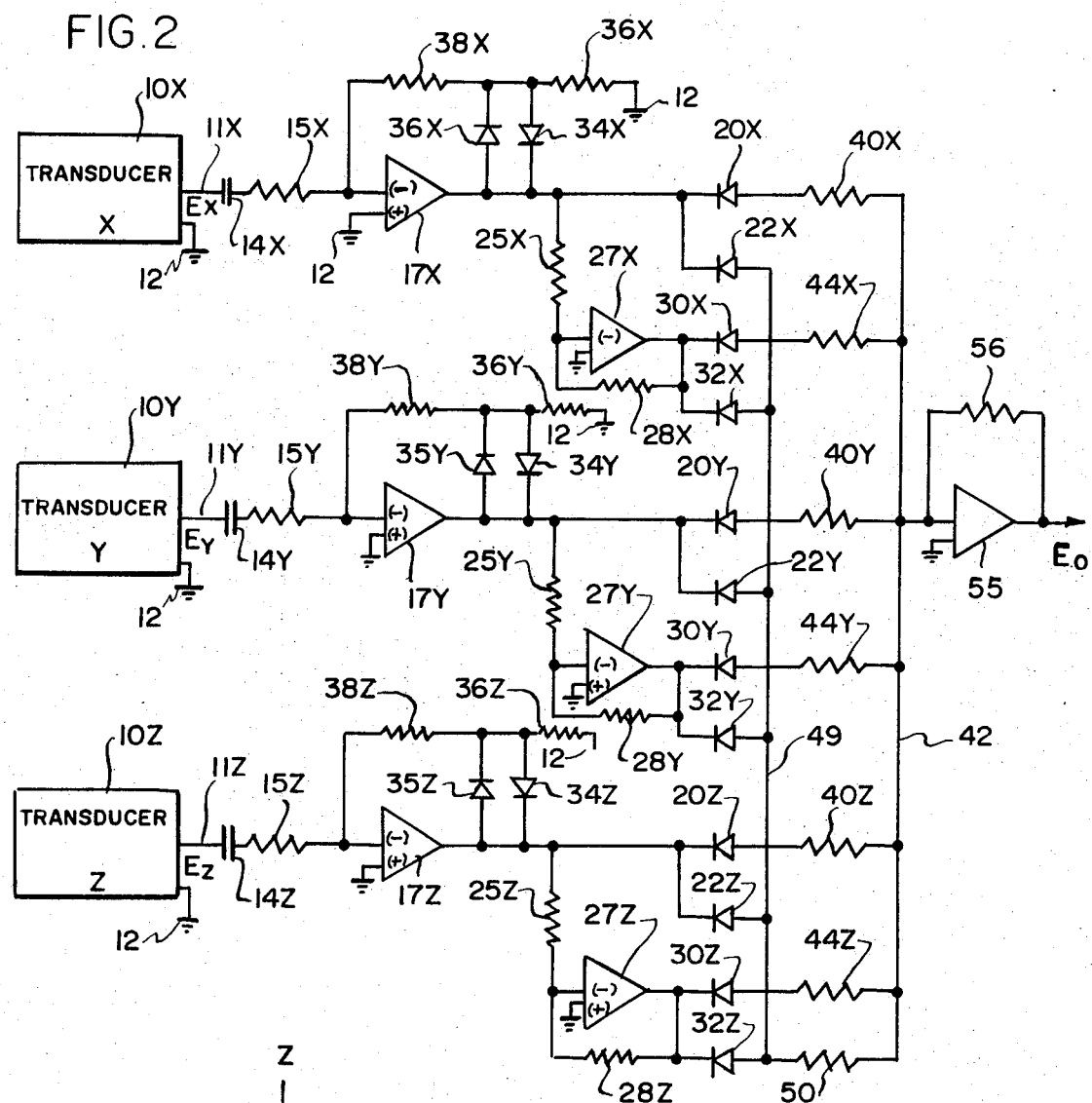

United States Patent [19]
Siegel

[11] 3,710,087
[45] Jan. 9, 1973

[54] CALCULATION OF APPROXIMATE MAGNITUDE OF A PHYSICAL VECTOR QUANTITY

[76] Inventor: Vernon H. Siegel, c/o Kistler Instrument Corporation 8989 Sheridan Drive, Clarence, N.Y. 14031

[22] Filed: March 24, 1971

[21] Appl. No.: 127,577

[52] U.S. Cl. ................235/189, 235/179, 235/193, 307/231, 307/321
[51] Int. Cl. .............................................G06g 7/22
[58] Field of Search.235/189, 186, 197, 179, 150.25, 235/193, 193.5; 33/226; 73/1, 178

[56] References Cited

UNITED STATES PATENTS

| | | | |
|---|---|---|---|
| 2,924,709 | 2/1960 | Morrill | 235/189 X |
| 3,084,862 | 4/1963 | Nathan | 235/193 X |
| 3,292,150 | 12/1966 | Wood | 235/193 X |
| 3,354,299 | 11/1967 | Feldman | 235/193.5 X |
| 3,422,257 | 1/1969 | Jackson | 235/193 |
| 3,463,909 | 8/1969 | Weiss | 235/150.25 |

OTHER PUBLICATIONS

Stern et al., Circuit for the Square Root of the Sum of the Squares. Proceedings IEEE April 1963, p. 593/596
Klingdon et al., Non Linear Function Generator Instruments and Control Systems. Sept. 1970, p. 121/123

Primary Examiner—Felix D. Gruber
Attorney—Hofgren, Wegner, Allen, Stellman & McCord

[57] ABSTRACT

A method and apparatus for calculating the approximate magnitude of a vector resultant physical quantity, such as acceleration, pressure, or force, from its orthogonal component quantities eliminates the necessity for squaring or square root computations. Three electrical component representations, as from transducers oriented along three orthogonal axes, are summed together and added to the largest magnitude one of the electrical representations to produce a resultant which approximately equals the magnitude of the resultant vector in space. In a preferred embodiment, the summed representations are multiplied by a scale factor of 0.58 before being added to the largest magnitude representation.

16 Claims, 2 Drawing Figures

INVENTOR.
VERNON H. SIEGEL
BY Hofgren, Wegner, Allen,
Stellman & McCord.
ATTORNEY.

CALCULATION OF APPROXIMATE MAGNITUDE OF A PHYSICAL VECTOR QUANTITY

This invention relates to a method and apparatus for calculating the approximate magnitude of a physical quantity represented by a vector, and more particularly to calculating the approximate magnitude of a vector quantity without taking the square or the square root of any of the components forming the vector.

It is often desired to measure or detect the magnitude, but not the direction, of applied physical quantities which can be represented by a vector, such as pressure, force, acceleration, and the like. Such measurements are used in many applications, as for determining the peak acceleration experienced by a package during transportation and handling, the pressure on a test object during a blast, and forces generated in soils. The magnitude of the resultant vector can be measured by an omnidirectional transducer, or by a system using transducers oriented along orthogonal axes and a circuit for combining the signals to indicate the resultant vector magnitude.

Many problems are known in the art with respect to producing a practical omnidirectional transducer. It has been suggested to employ a spherical ball surrounded by radially polarized piezoelectric material. However, with such a construction it is difficult to achieve proper preload and to achieve sufficiently constant sensitivity over the desired directions, which may include a full sphere.

As a result, the usual practice is to use individual transducers each oriented along a different orthogonal axis. The magnitude of the resultant vector can be calculated from the measured quantities of its three components in a Cartesian or rectangular coordinate system. If the vector components are orthogonal, it is well known that the resultant vector has a magnitude equal to the square root of the sum of the squares of the component quantities. A number of circuits have evolved for squaring the signals from three transducers, summing the same, and then taking the square root of the result. While such circuits provide an exact calculation of vector magnitude, they are complex and bulky, as well as being generally difficult to adapt to microminiaturization techniques.

In many instances, it is sufficient to determine the approximate, rather than exact, magnitude of the resultant vector. In accordance with the present invention, a unique and simple method and apparatus are disclosed which allow the approximate magnitude of a resultant vector to be calculated without requiring computations concerning the square and square root of the components. Several embodiments are presented, which may be selected depending upon the desired accuracy which is sufficient for the intended application. All embodiments are simple in theory, and may be miniaturized without problems.

One object of this invention is the provision of a method and apparatus for determining the approximate magnitude of a vector from unique computations concerning its components.

Another object of this invention is the provision of an omnidirectional transducer system for calculating the approximate magnitude of a vector in space from signals from three transducers oriented along orthogonal axes, by use of computations concerning addition and magnitude comparison and selection.

Figure 1:
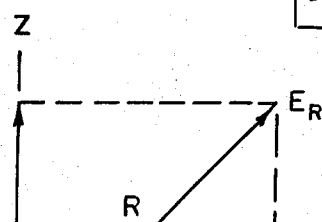

Other advantages and features of the invention will be apparent from the following description and from the drawings, in which:

FIG. 1 is a vector diagram illustrating the magnitudes $E_X$, $E_Y$ and $E_Z$ of the orthogonal components forming a vector resultant having an actual magnitude $E_R$ along any direction in three dimensional space; and FIG. 2 is a schematic diagram of one embodiment of the invention for calculating an approximate magnitude $E_O$ of the vector R in FIG. 1.

While an illustrative embodiment of the invention is shown in the drawings and will be described in detail herein, the invention is susceptible of embodiment in many different forms and it should be understood that the present disclosure is to be considered as an exemplification of the principles of the invention and is not intended to limit the invention to the embodiment illustrated. Throughout the specification, values will be given for certain of the components in order to disclose a complete, operative embodiment of the invention. However, it should be understood that such values are merely representative and are not critical unless specifically so stated.

Turning to FIG. 1, any physical quantity having both magnitude and direction, such as pressure, force, acceleration, ecetera, can be represented by a vector resultant R formed by three orthogonal components coinciding with X, Y and Z axes in a rectangular space coordinate system. By any suitable input as from transducers, data processing machines, etc., the magnitudes $E_X$, $E_Y$ and $E_Z$ of the components may be identified by an electrical representation, which may take the form of voltage, binary digits, and the like. In the diagram, angle $\theta$ represents the roll angle of the resultant vector R from the Z axis. The angle $\phi$ is the angle of the vector R $\sin\theta$ measured from the X axis in the XY plane. The magnitudes $E_X$, $E_Y$ and $E_Z$ of the component vectors are indicated in the diagram in conventional terms. It is well known that the exact magnitude $E_R$ of the vector R is given by the following equation:

$$E_R = \sqrt{E_X^2 + E_Y^2 + E_Z^2} \quad (1)$$

The apparatus and method of the present invention allow the approximate magnitude of $E_R$ to be calculated without requiring the nonlinear computations of squaring and taking the square root, as used by conventional methods and apparatuses which solve equation (1).

Turning to FIG. 2, a preferred embodiment of the invention is illustrated for calculating the approximate magnitude $E_O$ of the physical vector R illustrated in FIG. 1. The accuracy or maximum deviation of the calculated signal $E_O$ from the actual vector magnitude $E_R$ is on the order of ±7.5 percent, although for most regions of a sphere the calculated vector magnitude is within 3 percent of the actual value. This accuracy is sufficient for a great variety of applications where an omnidirectional output is required.

The illustrated circuit of FIG. 2 implements the following equation which provides an approximate solution for computing the magnitude of a vector resultant from its three measured components $E_X$, $E_Y$ and $E_Z$, namely:

$E_O = K(|E_X| + |E_Y| + |E_Z|) +$ largest value of $$|E_X|, |E_Y|, \text{ or } |E_Z|' \quad (2)$$

The value of the constant $K$ can be different in different applications and is computed by considering the anticipated range of locations for the vector R within one-eighth of a sphere, namely for angles of $\theta$ and $\phi$ from 0° to 90° in FIG. 1. The value computed for $K$ is then identical for the remaining seven sections of the sphere.

If the vector R is within a one-eighth sphere, then $K$ is computed by making the vector magnitude $E_O$ when vector R is angularly equidistant from the X, Y and Z axes equal to the vector magnitude $E_O$ when vector R is coincident with the X, Y, or Z axes. Expressed in mathematical terms, the value of $K$ or any situation can be determined by solving the following equation:

$$E_O(E_{X_1}, E_{Y_1}, E_{Z_1}) = E_O(E_{X_2}, E_{Y_2}, E_{Z_2}) \quad (3)$$

where subscript 1 represents the component values for a vector $R_1$ having one orientation in space and the subscript 2 represents the component values for a vector $R_2$ having a different orientation in space but equal magnitude $E_O$.

For the condition described above in which the vector may have any orientation, it is necessary to find the equidistant point in order to solve equation (3) for that condition. For this purpose, $$E_X = E_Y = E_Z$$

$$R\sin\theta\cos\phi = R\sin\theta\sin\phi = R\cos\theta$$

$$\cos\phi = \sin\theta$$

$$\phi = 45°$$

Now $R\cos\theta = R\sin\theta(0.707)$ or $\theta = 54.8°$

When $\theta = 54.8°$ and $\phi = 45°$, Equation (2) becomes $$E_O = K(0.577 + 0.816(0.707) + 0.816(0.707)) + 0.577$$

$$= 1.731K + 0.577$$

When R lies along the X, Y or Z axis:

$$E_O = K + 1$$

Now using equation (3):

$$1.731K + 0.577 = K + 1$$

or $K = 0.577 \quad (4)$

FIG. 2 shows one form of circuitry to implement the method of equation (2) when using the value of $K$ in equation (4). SInce many components in channels associated with the X, Y and Z axes are identical, similar components have been identified by the same reference numeral, followed by an X, Y or Z to indicate that the component is associated with the X, Y or Z axes, respectively. A transducer 10 for each of the three orthogonal axes X, Y and Z measures the physical component quantity and provides a corresponding output voltage E representative of its magnitude. Each transducer 10 may, for example, take the form of a standard piezotron accelerometer having only one sensitive measurement axis, each oriented with a different orthogonal axis, and containing suitable structure to withstand cross-axis shocks without shifting of its mechanical components.

Each transducer 10 may contain electrical filtering and an impedance converter to produce a low impedance normalized voltage output signal E on an output line 11 with respect to a common source of reference potential or ground 12. Each transducer output signal E is coupled through a capacitor 14, as 1.0 microfarads, and a resistor 15, as 200 kilohms, to an amplifier 17. An amplified transducer signal output from amplifier 17 is then coupled to a semiconductor device of at least two terminals having a junction therebetween which can be biased forwardly or reversely, as a diode 20 connected to a circuit which performs the summing function in equation (2), and a similar diode 22 used in a circuit for selecting the largest magnitude value of only one of the signals $E_X$, $E_Y$ or $E_Z$.

If the output of amplifier 17 is not unipolarity, that is, the transducer signals have both polarities indicating that the resultant vector R covers a complete sphere rather than a hemisphere, an inverting channel is necessary in order that the absolute value of the transducer signal is always utilized. For this purpose, a resistor 25, as 10 kilohms, is coupled from the output of amplifier 17 to the input of an amplifier 27, connected to function as an inverter. The output of amplifier 27, having a 10 kilohm feedback resistor 28, is coupled to a diode 30, similarly constructed and poled to diode 20, for performing the summation function in equation (2), and to a diode 32, similarly constructed and poled to diode 22, for selecting the largest value of $E_X$, $E_Y$ or $E_Z$ of an opposite polarity to that selected by the diode 22.

The voltage drop across the diodes 20 or 30 and 22 or 32 is offset by a similar voltage drop across one of a pair of diodes 34 and 35 associated with each amplifier 17. This voltage drop is produced at identical currents as determined by a resistor 36, as 25 kilohms, connected between the diodes 34, 35 and ground 12. A resistor 38, as 1 megohm, is connected between the junction of diodes 34, 35 and the (−) input of amplifier 17. If desired, the amplifier 17, formed by an operational amplifier of the low input current type, may contain additional components to perform filtering functions for the transducer signal E. Amplifier 17 in conjunction with diodes 34 and 35 is used to remove any nonlinearity associated with the threshold conduction of the diodes 20 or 30 and 22 or 32. The amplifier 17 can be eliminated if the input signal is of sufficient amplitude and hence Germanium rather than Silicon diodes can be employed, or if a slight linearity deviation near zero output can be tolerated. If the operational amplifier 17 has a differential output, the inverter amplifier 27 may be eliminated.

A scale factor resistor 40, as 35 kilohms, is coupled in series between diode 20 and a summing junction line 42. A similar resistor 44, also 35 kilohms, is connected in series between diode 30 and summing line 42. The resistance values of resistors 40 and 44 as compared to the resistance value of resistor 50 is chosen to provide the desired scale factor or multiplication ratio $K$, which in the exemplary illustration has a value of approximately 0.58, see equation (4). The diodes 20 and 30 allow only the positive value (represented by a negative voltage) of the signals $E_X$, $E_Y$ and $E_Z$ to be passed to the summing line 42. For example, if the signal from amplifier 17X has a positive voltage, the diode 20X blocks the voltage while the diode 30X couples the inverted voltage from amplifier 27X and via voltage dropping resistor 44X to line 42. If the signal had the opposite polarity, the voltage would be coupled through diode 20X, but blocked by diode 30X. In this manner, the circuit selects the absolute value of the signal E, and since each channel is connected to the same summing junction, produces on line 42 the following:

$$K \, (|E_X| + |E_Y| + |E_Z|) \quad (5)$$

All diodes 22 and 32 have their anodes connected to a common line 49 which is coupled through a resistor 50, as 20 kilohms, to the summing line 42. This circuit chooses only the largest magnitude of the absolute value of $E_X$, $E_Y$, or $E_Z$, for passage to the summing line 42. The operation is as follows. If $E_Y$ should have the largest absolute value, for example, and of such a polarity to produce a negative signal $-E_Y$ at the output of amplifier 17Y, then diode 22Y is forward biased and current flows from line 49, through resistor 50, to line 42. This causes the common line 49 to be clamped to the voltage of signal $-E_Y$, minus the small voltage drop across the semiconductor diode 22Y. Since the signals E for the other two channels are not greater than signal $E_Y$, the clamp voltage on line 49 reverse biases all the remaining diodes, thus allowing only the signal $E_Y$ to be coupled through the scale factor resistor 50 to summing line 42.

Summing line 42 is connected to the input of an amplifier 55 having a feedback resistor 56 of 25 kilohms value. The output of amplifier 55 couples the approximate magnitude signal $E_O$ to an output load. The amplifier desirably is short-circuit proof and has its output bias at ground potential.

A number of modifications can be made to the circuit of FIG. 2, depending upon the particular application and desired accuracy for the output signal $E_O$. If the resultant vector R, FIG. 1, does not exist in both positive and negative directions along one of the axes (or is not to be measured), then the amplifier 27 for that corresponding axis may be omitted. The resultant output signal $E_O$ will cover a hemisphere rather than a complete sphere. If the resultant vector R is similarly constrained along another axis, then the amplifier 27 for that axis may also be eliminated, causing the resultant output $E_O$ to cover one-fourth of a sphere.

The resistance values of resistors 40 and 44 as compared to resistor 50 are selected to produce the desired scale factor K calculated from equation (3). The ratio of resistor 50 to resistor 56, and resistor 40 or resistor 44 to resistor 56 determines the scale factor and the ratio of resistor 40 or resistor 44 to resistor 50 determines the factor K. The ratio of resistor 50 to resistor 40 or resistor 44 should be less than unity to make K less than unity. However, K can have a value of unity, which causes the calculated approximate magnitude to describe a sphere whose value at the equator and poles are equal, but the sphere bulges as large as 22 percent for large areas between the equator and poles. If this accuracy can be accepted, then equation (2) can be solved using K=1. Other scale factors can be used following the teachings of this invention, depending upon the necessary accuracy.

Where accuracies less than those described above can be tolerated, the circuit of FIG. 2 can be substantially simplified. For example, if variations on the order of 50 percent or so can be tolerated between the actual resultant magnitude and the calculated approximate resultant magnitude for certain sectors of the sphere, then the circuit can be changed to implement the following equation:

$$E_O = |E_Z| + 1.2(\text{largest of } |E_X| \text{ or } |E_Y|) \quad (6)$$

In implementing equation (6), the largest value of $E_X$ or $E_Y$ can be determined by the same circuit used in FIG. 2 for $E_X$ and $E_Y$, namely, diodes 22X, 32X and 22Y, 32Y connected via line 49 with resistor 50. Diodes 22Z and 32Z would be omitted. In such an implementation, the resistance value of resistor 50 would be changed in order to produce a scale factor of 1.2. Since the 1.2 times the largest of $|E_X|$ or $|E_Y|$ is summed only with the absolute value of $E_Z$, only the summation circuit associated with diodes 20Z and 30Z need be utilized, the circuit associated with diodes 20X, 30X and 20Y and 30Y being eliminated. Other combinations than those described above will be apparent to those skilled in the art in view of the previous descriptions.

I claim:

1. An omnidirectional transducer system for calculating the approximate magnitude of a vector resultant quantity from a plurality of measured component vector quantities along orthogonal axes, comprising:
   a plurality of transducers each having a sensitive measurement axis coinciding with a different one of said orthogonal axes to provide a plurality of transducer signals each representing a measured magnitude of the component vector quantity along its sensitive axis;
   selection means coupled to said transducers for producing a signal proportional to the largest magnitude of at least two of said plurality of transducer signals;
   means coupled to said transducers for passing at least one signal proportional in magnitude to said plurality of transducer signals; and
   means coupled to said selection means and said passing means for summing said largest magnitude signal with said at least one signal to produce a sum signal proportional to the approximate magnitude of said vector resultant quantity.

2. The system of claim 1 including scale factor means for providing a scale factor other than unity for one of the selected or passed signals.

3. The system of claim 2 for calculating the approximate magnitude of a vector resultant quantity from three measured component vector quantities along orthogonal axes, wherein said plurality of transducers comprise three transducers each having its sensitive measurement axis coinciding with a different one of said three orthogonal axes to produce three transducer signals, said passing means passing three value signals each proportional in value to corresponding ones of said three transducer signals, said scale factor means providing a scale factor less than unity for each of the three value signals to produce said sum signal.

4. The system of claim 3 wherein said scale factor means provides a scale factor on the order of 0.58.

5. The system of claim 1 wherein said selection means includes first absolute value means for causing said largest magnitude signal to be proportional to the absolute value of the largest magnitude one of said signals, said passing means includes second absolute value means for causing said one signal to be proportional to the absolute value of one of said plurality of transducer signals, and said summing means being coupled to both of said absolute value means for summing the absolute value of said largest magnitude signal with the absolute value of said at least one signal to produce said sum signal.

6. The system of claim 5 wherein each of said absolute value means includes inverter means coupled to an input means for generating an inverted output having an opposite polarity to the signal at said input means, first diode means coupled to said input means and poled to pass only one polarity of the signal, second diode means coupled to said inverter means and poled to pass the inverted output only when said first diode means is being blocked, said summing means being coupled to all of said first and second diode means.

7. The system of claim 6 wherein said summing means includes first resistive means in series with said first diode means and second resistive means in series with said second diode means, each of said resistive means providing a scale factor other than unity for the signal passed by the associated diode means.

8. The system of claim 1 wherein said selection means includes at least two semiconductor means corresponding to said at least two transducer signals, each semiconductor means having at least first and second terminals for passing current flow when forward biased and for blocking current flow when reverse biased, means connecting each of said first terminals to the transducer means for producing said corresponding transducer signals, and means coupling said second terminals in common so that the forward biased semiconductor means passes a current which reverse biases the remaining semiconductor means.

9. The system of claim 8 including compensating means coupled between each of said at least two transducers and the corresponding first terminals of said semiconductor means for compensating for the voltage drop across said semiconductor means, said compensating means comprising second semiconductor means of the same type as said first named semiconductor means.

10. A method of calculating the approximate magnitude of a vector resultant quantity from three orthogonal component vector quantities each represented by an electrical representation $E_X$, $E_Y$ and $E_Z$, comprising the automatic signal processing steps of:

scaling the magnitude values of the electrical representations $E_X$, $E_Y$ and $E_Z$ to produce at least one scaled electrical representation;

determining which of said electrical representations $E_X$, $E_Y$ or $E_Z$ has the largest magnitude value and producing a largest value electrical representation corresponding thereto; and adding the largest value electrical representation to the at least one scaled electrical representation to produce an output electrical representation proportional to the magnitude of said vector resultant quantity.

11. The method of claim 10 wherein the step of scaling includes multiplying by a scale factor $K$ of less than unity the summed magnitude values of $E_X$ and $E_Y$ and $E_Z$.

12. The method of claim 11 wherein said scale factor $K$ less than unity is a number on the order of 0.58.

13. The method of claim 10 wherein the step of determining includes determining an absolute value of the determined largest magnitude value, whereby the absolute value is added to the scaled magnitude values to produce said output electrical representation.

14. The method of claim 10 wherein the step of determining comprises determining the absolute value of one of said electrical representations $E_X$ or $E_Y$ or $E_Z$ before adding to cause the vector resultant quantity to be constrained in direction to a quarter of a sphere.

15. The method of claim 14 wherein the step of determining comprises determining the absolute value of an additional one of said electrical representations $E_X$ or $E_Y$ or $E_Z$ before adding to cause the vector resultant quantity to be constrained in direction to a hemisphere.

16. The method of claim 15 wherein the step of determining comprises determining the absolute value of the last one of said electrical representations $E_X$ or $E_Y$ or $E_Z$ before adding to cause the vector resultant quantity to have directions unconstrained within a whole sphere.

* * * * *